US008107775B2

(12) United States Patent  (10) Patent No.: US 8,107,775 B2
Onomura  (45) Date of Patent: Jan. 31, 2012

(54) IMAGE PROCESSING APPARATUS AND METHOD, AND ELECTRONIC CAMERA

(75) Inventor: Kenichi Onomura, Hino (JP)

(73) Assignee: Olympus Imaging Corp, Tokyo (JP)

( * ) Notice: Subject to any disclaimer, the term of this patent is extended or adjusted under 35 U.S.C. 154(b) by 979 days.

(21) Appl. No.: 12/027,889

(22) Filed: Feb. 7, 2008

(65) Prior Publication Data

US 2008/0193049 A1  Aug. 14, 2008

(30) Foreign Application Priority Data

Feb. 9, 2007  (JP) ................................. 2007-030485

(51) Int. Cl.
 *G06K 9/32* (2006.01)
(52) U.S. Cl. ........ 382/300; 382/162; 382/274; 708/290; 345/590; 345/538
(58) Field of Classification Search .................. 382/162, 382/167, 274, 300; 708/290, 847; 345/589, 345/590, 591, 592; 358/428, 525; 348/538, 348/441, 449, 222.1, 252, 234, 451, 280, 348/453
See application file for complete search history.

(56) References Cited

U.S. PATENT DOCUMENTS

| 5,596,684 | A | * | 1/1997 | Ogletree et al. ............... 358/1.9 |
| 6,057,866 | A | * | 5/2000 | Haneda et al. ................ 347/118 |
| 6,072,510 | A | * | 6/2000 | Ogletree et al. ............... 347/131 |
| 6,380,974 | B1 | * | 4/2002 | Hieda et al. ................ 348/222.1 |
| 2006/0139707 | A1 | * | 6/2006 | Kimura ......................... 358/518 |

FOREIGN PATENT DOCUMENTS

| JP | 11-146407 | 5/1999 |
| JP | 2003-299112 | 10/2003 |
| JP | 2004-147093 | 5/2004 |
| JP | 2006-352717 | 12/2006 |
| JP | 2007-6038 | 1/2007 |

OTHER PUBLICATIONS

Notice of Reasons for Rejection for Japanese Patent Application No. 2007-030485, mailed Dec. 6, 2011 (3 pgs.) with translation (3 pgs.).

* cited by examiner

*Primary Examiner* — Samir Ahmed
*Assistant Examiner* — Ali Bayat
(74) *Attorney, Agent, or Firm* — Straub & Pokotylo; John C. Pokotylo (57) ABSTRACT

An image processing apparatus obtains color image data by performing an interpolation processing for an image signal output from a color image pickup element having color filters arranged like a mosaic, by using a filter. The apparatus includes an interpolation processing unit which selectively modifies an interpolation processing according to a kind of layout pattern of a spatial center position of gravity of each color component signal included the image signal in an image area to be interpolated, so that the spatial center position of gravity of each color component signal after the interpolation processing becomes identical in any layout pattern, if there are a plurality of kinds of layout pattern of a spatial center position of gravity of each color component signal included the image signal in an image area to be interpolated.

11 Claims, 12 Drawing Sheets

FIG. 1

Before addition of pixels

FIG. 2A

Addition of nine pixels

FIG. 2B

Virtual center positions of gravity (all colors)

Virtual center positions of gravity after addition of nine pixels

FIG. 3

Before addition of pixels

FIG. 4A

Addition of four pixels

FIG. 4B

Virtual center positions of gravity (all colors)

Virtual center positions of gravity after addition of four pixels

FIG. 5

Bayer arrangement                R/G/B planes FIG. 6A              FIG. 6B Position after interpolation processing

FIG. 7A

FIG. 7B Filter coefficients

| Normal Bayer | | | |
|---|---|---|---|
| R | Gr | R | Gr |
| Gb | B | Gb | B |
| R | Gr | R | Gr |
| Gb | B | Gb | B |

FIG. 8A

Filter coefficients

| 1 | 3 | 3 | 1 |
|---|---|---|---|
| 3 | 9 | 9 | 3 |
| 3 | 9 | 9 | 3 |
| 1 | 3 | 3 | 1 |

● Position after interpolation processing (same for all colors)

FIG. 8B 4-pixel addition bayer

| | | | | | | | |
|---|---|---|---|---|---|---|---|
| | R | Gr | | | R | Gr | |
| | Gb | B | | | Gb | B | |
| | | | | | | | |
| | | | | | | | |
| | R | Gr | | | R | Gr | |
| | Gb | B | | | Gb | B | |
| | | | | | | | |

FIG. 8C 4-pixel addition bayer

| 1 | 3 | | | 3 | 1 | |
|---|---|---|---|---|---|---|
| 3 | 9 | | | 9 | 3 | |
| | | ● | ● | | | |
| | | ● | ● | | | |
| 3 | 9 | | | 9 | 3 | |
| 1 | 3 | | | 3 | 1 | |

● R position after interpolation processing
● Gr Position after interpolation processing
● B Position after interpolation processing
● Gb Position after interpolation processing } The center of gravity of each color is displaced

FIG. 8D

FIG. 9A Beginning color: R

FIG. 9B Beginning color: Gr

FIG. 9C Beginning color: Gb

FIG. 9D Beginning color: B

FIG. 9E Position after interpolation processing (same for all colors)

FIG. 9F Gr and Gb positions after interpolation processing / R and B positions after interpolation processing FIG. 9G Gb and B positions after interpolation processing / R and Gr positions after interpolation processing FIG. 9H Gb position after interpolation processing / R position after interpolation processing / B position after interpolation processing / Gr position after interpolation processing

FIG. 10

FIG. 11A  Beginning color: R
FIG. 11B  Beginning color: Gr
FIG. 11C  Beginning color: Gb
FIG. 11D  Beginning color: B FIG. 11E  Position after interpolation processing (same for all colors)
FIG. 11F  Position after interpolation processing (same for all colors)
FIG. 11G  Position after interpolation processing (same for all colors)
FIG. 11H  Position after interpolation processing (same for all colors)

| Beginning color: R | | |
|---|---|---|
| R1 | Gr1 | R2 | Gr2 |
| Gb1 | B1 | Gb2 | B2 |
| R3 | Gr3 | R4 | Gr4 |
| Gb3 | B3 | Gb4 | B4 |

FIG. 12A

| Beginning color: Gr | | |
|---|---|---|
| Gr1 | R1 | Gr2 | R2 |
| B1 | Gb1 | B2 | Gb2 |
| Gr3 | R3 | Gr4 | R4 |
| B3 | Gb3 | B4 | Gb4 |

FIG. 12B

| Beginning color: Gb | | |
|---|---|---|
| Gb1 | B1 | Gb2 | B2 |
| R1 | Gr1 | R2 | Gr2 |
| Gb3 | B3 | Gb4 | B4 |
| R3 | Gr3 | R4 | Gr4 |

FIG. 12C

| Beginning color: B | | |
|---|---|---|
| B1 | Gb1 | B2 | Gb2 |
| Gr1 | R1 | Gr2 | R2 |
| B3 | Gb3 | B4 | Gb4 |
| Gr3 | R3 | Gr4 | R4 |

FIG. 12D

| 9 | 15 | 15 | 9 |
|---|---|---|---|
| 15 | 25 | 25 | 15 |
| 15 | 25 | 25 | 15 |
| 9 | 15 | 15 | 9 |

$Rout = (9 \times R1 + 15 \times R2 + 15 \times R3 + 25 \times R4)/64$
$Grout = (15 \times Gr1 + 9 \times Gr2 + 25 \times Gr3 + 15 \times Gr4)/64$
$Gbout = (15 \times Gb1 + 25 \times Gb2 + 9 \times Gb3 + 15 \times Gb4)/64$
$Bout = (25 \times B1 + 15 \times B2 + 15 \times B3 + 9 \times B4)/64$

FIG. 12E

| 3 | 21 | 21 | 3 |
|---|---|---|---|
| 5 | 35 | 35 | 5 |
| 5 | 35 | 35 | 5 |
| 3 | 21 | 21 | 3 |

$Rout = (21 \times R1 + 3 \times R2 + 35 \times R3 + 5 \times R4)/64$
$Grout = (3 \times Gr1 + 21 \times Gr2 + 5 \times Gr3 + 35 \times Gr4)/64$
$Gbout = (35 \times Gb1 + 5 \times Gb2 + 21 \times Gb3 + 3 \times Gb4)/64$
$Bout = (5 \times B1 + 35 \times B2 + 3 \times B3 + 21 \times B4)/64$

FIG. 12F

| 3 | 5 | 5 | 3 |
|---|---|---|---|
| 21 | 35 | 35 | 21 |
| 21 | 35 | 35 | 21 |
| 3 | 5 | 5 | 3 |

$Rout = (21 \times R1 + 35 \times R2 + 3 \times R3 + 5 \times R4)/64$
$Grout = (35 \times Gr1 + 21 \times Gr2 + 5 \times Gr3 + 3 \times Gr4)/64$
$Gbout = (3 \times Gb1 + 5 \times Gb2 + 21 \times Gb3 + 35 \times Gb4)/64$
$Bout = (5 \times B1 + 3 \times B2 + 35 \times B3 + 21 \times B4)/64$

FIG. 12G

| 1 | 7 | 7 | 1 |
|---|---|---|---|
| 7 | 49 | 49 | 7 |
| 7 | 49 | 49 | 7 |
| 1 | 7 | 7 | 1 |

$Rout = (49 \times R1 + 7 \times R2 + 7 \times R3 + 1 \times R4)/64$
$Grout = (7 \times Gr1 + 49 \times Gr2 + 1 \times Gr3 + 7 \times Gr4)/64$
$Gbout = (7 \times Gb1 + 1 \times Gb2 + 49 \times Gb3 + 7 \times Gb4)/64$
$Bout = (1 \times B1 + 7 \times B2 + 7 \times B3 + 49 \times B4)/64$

IMAGE PROCESSING APPARATUS AND METHOD, AND ELECTRONIC CAMERA

CROSS-REFERENCE TO RELATED APPLICATIONS

This application is based upon and claims the benefit of priority from prior Japanese Patent Application No. 2007-030485, filed Feb. 9, 2007, the entire contents of which are incorporated herein by reference.

BACKGROUND OF THE INVENTION

1. Field of the Invention

The present invention relates to an image processing apparatus and method characterized by a pixel interpolation processing (synchronization processing), and an electronic camera.

2. Description of the Related Art

An image pickup element (CCD, CMOS, etc.) used in a digital camera has a mosaic-like pixel layout generally called a Bayer arrangement.

In a Bayer arrangement, only one color component is assigned to one pixel. Therefore, an image processing apparatus performs a synchronizing process (interpolation, demosaic) to give all pixels R/G/B color components.

A recent image pickup element has a pixel addition (pixel mixing, binning) mode to output a charge after adding electric charges stored in each pixel in order to be adaptable to high-sensitive photographing and high-speed reading.

Depending on the number of pixels to be added, the virtual center of gravity is displaced, causing a color shift and a false color.

Jpn. Pat. Appln. KOKAI Publication No. 2004-147093 discloses a technique for correcting such a color shift. In Jpn. Pat. Appln. KOKAI Publication No. 2004-147093, a correction circuit to correct displacement of the center of gravity is provided preceding to a synchronizing circuit.

BRIEF SUMMARY OF THE INVENTION

According to a first aspect of the invention, there is provided an image processing apparatus for obtaining color image data by performing an interpolation processing for an image signal output from a color image pickup element having color filters arranged like a mosaic, by using a filter, comprising: an interpolation processing unit which selectively modifies an interpolation processing according to a kind of layout pattern of a spatial center position of gravity of each color component signal included the image signal in an image area to be interpolated, so that the spatial center position of gravity of each color component signal after the interpolation processing becomes identical in any layout patter, if there are a plurality of kinds of layout pattern of a spatial center position of gravity of each color component signal included the image signal in an image area to be interpolated.

According to a second aspect of the invention, there is provided an electronic camera comprising: a color image pickup element having color filters arranged like a mosaic; and an interpolation processing unit which obtains color image data by performing an interpolation processing for an image signal output from the color image pickup element, by using a filter, wherein the interpolation processing unit selectively modifies an interpolation processing according to a kind of a layout pattern of a spatial center position of gravity of each color component signal included the image signal in an image area to be interpolated, so that the spatial center position of gravity of each color component signal after the interpolation processing becomes identical in any layout patter, if there are a plurality of kinds of layout pattern of a spatial center position of gravity of each color component signal included the image signal in an image area to be interpolated.

According to a third aspect of the invention, there is provided an image processing method for obtaining color image data by performing an interpolation processing for an image signal output from a color image pickup element having color filters arranged like a mosaic, comprising: determining whether there are a plurality of kinds of layout pattern of position of spatial center of gravity of each color component signal included the image signal in an image area to be interpolated; and changing an interpolation processing according to a kind of a layout pattern of a spatial center position of gravity of each color component signal included the image signal in an image area to be interpolated, so that the spatial center position of gravity of each color component signal after the interpolation processing becomes identical in any layout patter, if there are a plurality of kinds of layout pattern of a spatial center position of gravity of each color component signal included the image signal in an image area to be interpolated.

According to a fourth aspect of the invention, there is provided an image processing apparatus for performing image processing for an image data digitized from an image signal obtained from an image pickup element having a Bayer arrangement in a pixel addition mode to calculate and output a result of detection of pixel values of two or more same color pixels, comprising: a coefficient memory which previously stores a plurality of sets of interpolation filter coefficients; a color layout discriminator which discriminates a color layout in an image area to be interpolated in the image data; a coefficient selector which selects a set of interpolation filter coefficients from the coefficient memory, according to a color layout discriminated by the color layout discriminator; and an interpolation processing unit which performs an interpolation processing for the image data of the image area to be interpolated, by using the set of interpolation filter coefficients selected by the coefficient selector, and generates the image data consisting of pixels having all color components.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
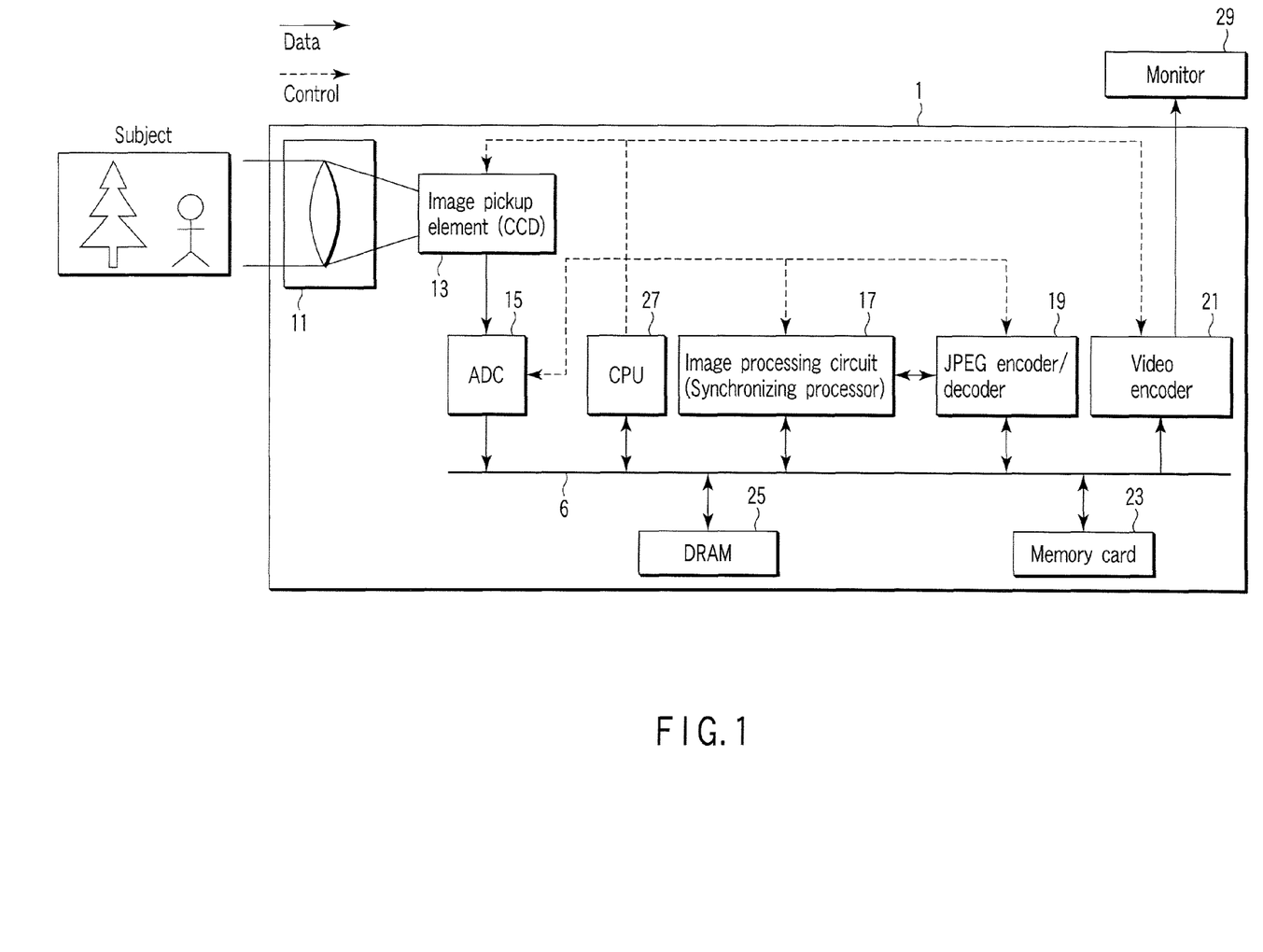
FIG. 1 is a block diagram of an electronic camera according to an embodiment of the present invention.

Hereinafter, an electronic camera according to an embodiment of the present invention will be explained. FIG. 1 is a block diagram of an electronic camera according to an embodiment of the invention.

As shown in FIG. 1, the electronic camera 1 has an optical system 11, an image pickup element 13, an analog digital converter (ADC) 15, an image processing circuit 17, a joint photographic experts group (JPEG) encoder/decoder 19, a video encoder 21, a memory card 23, a dynamic random access memory (DRAM) 25, a central processing unit (CPU) 27, a monitor 29, and a bus 6.

The ADC 15, image processing circuit 17, JPEG encoder/decoder 19, video encoder 21, memory card 23, DRAM 25 and CPU 27 are electrically connected through the bus 6.

The optical system 11 includes an image pickup lens. The optical system 11 forms an optical image of a subject.

The image pickup element 13 has pixels. The image pickup element 13 receives light corresponding to an optical image formed by the optical system 11 by pixels, and photoelectrically converts the received light into an image signal.

The ADC 15 converts the analog image signals formed by the image pickup element 13 to a digital signal (image data). The image data is once stored in the DRAM 25.

The image processing circuit 17 performs image processing such as white balance adjustment and synchronizing process for the image data read from the DRAM 25, and writes the result into the DRAM 25. In the synchronizing process, the image processing circuit 17 generates pixel values of all pixel positions for color components of the image data read from the DRAM 25 by interpolation. The image processing circuit 17 will be explained in detail later.

When recording an image, the JPEG encoder/decoder 19 encodes the synchronized image data read from the DRAM 25, and writes the encoded image data into the memory card 23. When reproducing an image, the JPEG encoder/decoder 19 decodes the encoded image data read from the memory card 23, and writes the decoded data into the DRAM 25.

The video encoder 21 performs an image-displaying process for the image data read from the DRAM 25, and generates an analog image signal. Thereafter, the video encoder 21 displays an image corresponding to the generated analog image signal, on the monitor 29.

The CPU 27 integrally controls the operation of the electronic camera 1.

Hereinafter, the operation of the electronic camera 1 will be explained.

The CPU 27 controls components of the electronic camera 1 shown in FIG. 1. For example, the CPU 27 controls the operation of the image pickup element 13, reading of the image signal obtained by the image pickup element 13, and operations of the ADC 15, image processing circuit 17, JPEG encoder/decoder 19 and video encoder 21.

In FIG. 1, the optical image formed by the optical system 11 is received by the pixels of the image pickup element 13 comprising a CCD, for example. The image pickup element 13 converts the optical image received by the pixels into an analog image signal. The image signal obtained by the image pickup element 13 is read at a predetermined timing, and input to the ADC 15, under the control of the CPU 27. The ADC 15 converts the input analog image signal into image data that is a digital image signal. The image data obtained by the ADC 15 is stored in the DRAM 25 through the bus 6.

When recording an image, the image data stored in the DRAM 25 is read by the image processing circuit 17. The image processing circuit 17 synchronizes the read image data. Namely, the image processing circuit 17 performs interpolation, so that each pixel of image data has pixel values of three R/G/B colors. Thereafter, the image processing circuit 17 performs white balance adjustment of the synchronized image data. Then, the image processing circuit 17 converts the R/G/B image data to luminance/color difference data (hereinafter called YC data). After converting the R/G/B image data to YC data, the image processing circuit 17 performs gradation correction for Y-data, and color correction for C-data (Cb, Cr). The gradation correction and color correction may be performed in the state of R/G/B data. Thereafter, the image processing circuit 17 changes (down sampling) the ratio of a sampling frequency of each image component of the YC data (hereinafter called a sampling ratio) to reduce the data size of image data. The sampling ratio of Y:Cb:Cr=4:2:2 is used for recording a still image. The sampling ration of Y:Cb:Cr=4:2:0 is used for recording a moving image. Generally, human eyes are sensitive to changes in luminance, but relatively insensitive to changes in color difference. Thus, even if sampling is performed by reducing color difference information, an image is not so unnatural to human eyes when an image is reproduced.

The image data processed by the image processing circuit 17 is input to the JPEG encoder/decoder 19. The JPEG encoder/decoder 19 encodes the input image data by discrete cosine transformation (DCT), for example. The image data encoded by the JPEG encoder/decoder 19 is once stored in the DRAM 25. The image data is then stored in the memory card 23 as a JPEG file with the addition of predetermined header information.

When displaying an image obtained by the image pickup element 13 as a through image, the image processing circuit 17 resizes (usually reduces) the YC data to a predetermined size to meet the specifications of the monitor 29. Then, the image processing circuit 17 changes the sampling ratio of each image component of YC data (down sampling). The YC data is stored in the DRAM 25. The video encoder 21 reads the YC data stored in the DRAM 25 in units of frame, and displays an image in the monitor 29 based on the read YC data.

When reproducing the JPEG image data recorded on the memory card 23, the JPEG encoder/decoder 19 reads the JPEG image data recorded on the memory card 23, and decodes the read JPEG image data by a technique, such as inverse DCT conversion. Then, the image processing circuit 17 reduces the decoded YC data to a predetermined size for displaying. The YC data is once stored in the DRAM 25. The video encoder 21 reads the YC data stored in the DRAM 25 in units of frame, and displays an image in the monitor 29 based on the read YC data.

Hereinafter, the image pickup element 13 will be explained in detail.

[Image Pickup Element 13]

The image pickup element 13 is an image pickup device having pixels arranged in a Bayer arrangement of primary colors. The image pickup element 13 receives light corresponding to an optical image by pixels arranged like a matrix, for example. The image pickup element 13 has a pixel addition mode and an all-pixel mode for reading signals of all pixels. In this embodiment, a 9-pixel addition mode and 4-pixel addition mode are illustrated as a pixel addition mode executed by the image pickup element 13.

In the all-pixel mode, the image pickup element 13 transfers electric charge stored in each horizontal pixel to a vertical transfer register, and then sequentially transfers electric charge stored in each vertical transfer register to a horizontal transfer register. The image pickup element 13 sequentially gives a transfer pulse to the horizontal transfer register, and outputs an analog image signal corresponding to electric charge of a horizontal pixel to the ADC 15. An analog image signal is output for each line as described here.

In the pixel addition mode, the image pickup element 13 transfers electric charge, so that electric charges of the same color pixels are added (mixed) in horizontal and vertical directions. In a Bayer arrangement of primary colors, a filter of the same color is arranged at every one pixel. Therefore, the image pickup element 13 transfers electric charge, so that electric charge of each pixel is added at every-one-pixel timing. The image pickup element 13 outputs an analog image signal corresponding to the electric charge after the addition, to the ADC 15.

<9-Pixel Addition>

Figure 2A:
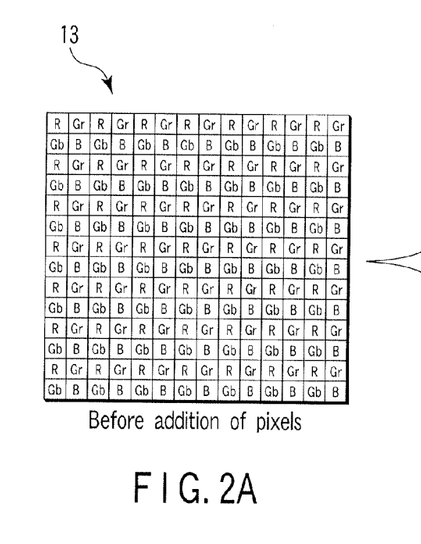
FIG. 2A is a diagram showing a Bayer arrangement of primary colors of the image pickup element 13 shown in FIG. 1.
Figure 2B:
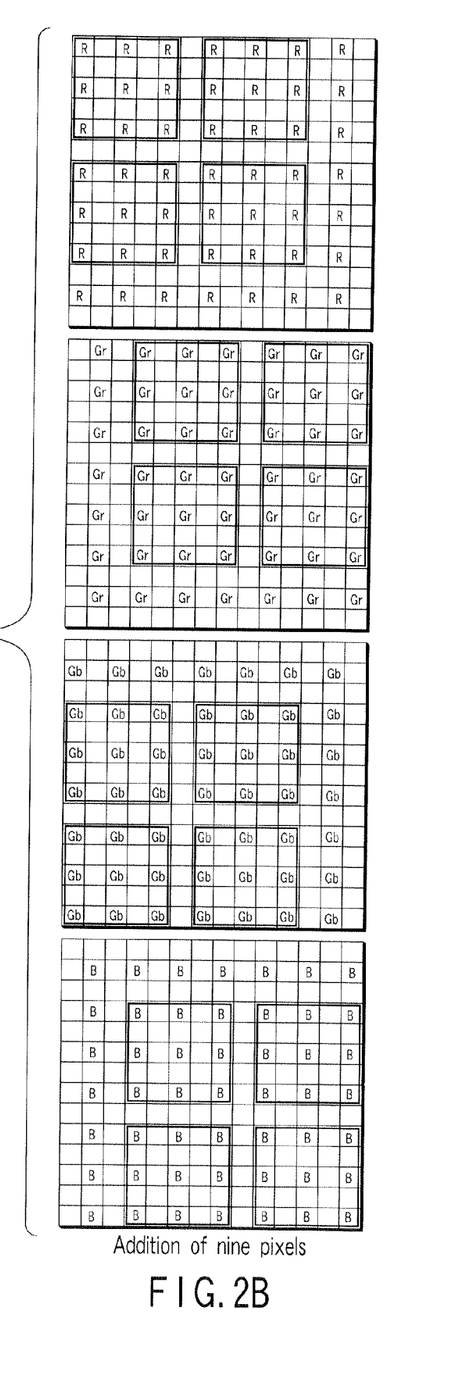
FIG. 2B is a diagram for explaining addition of nine pixels in a 9-pixel addition mode.
Figure 3:
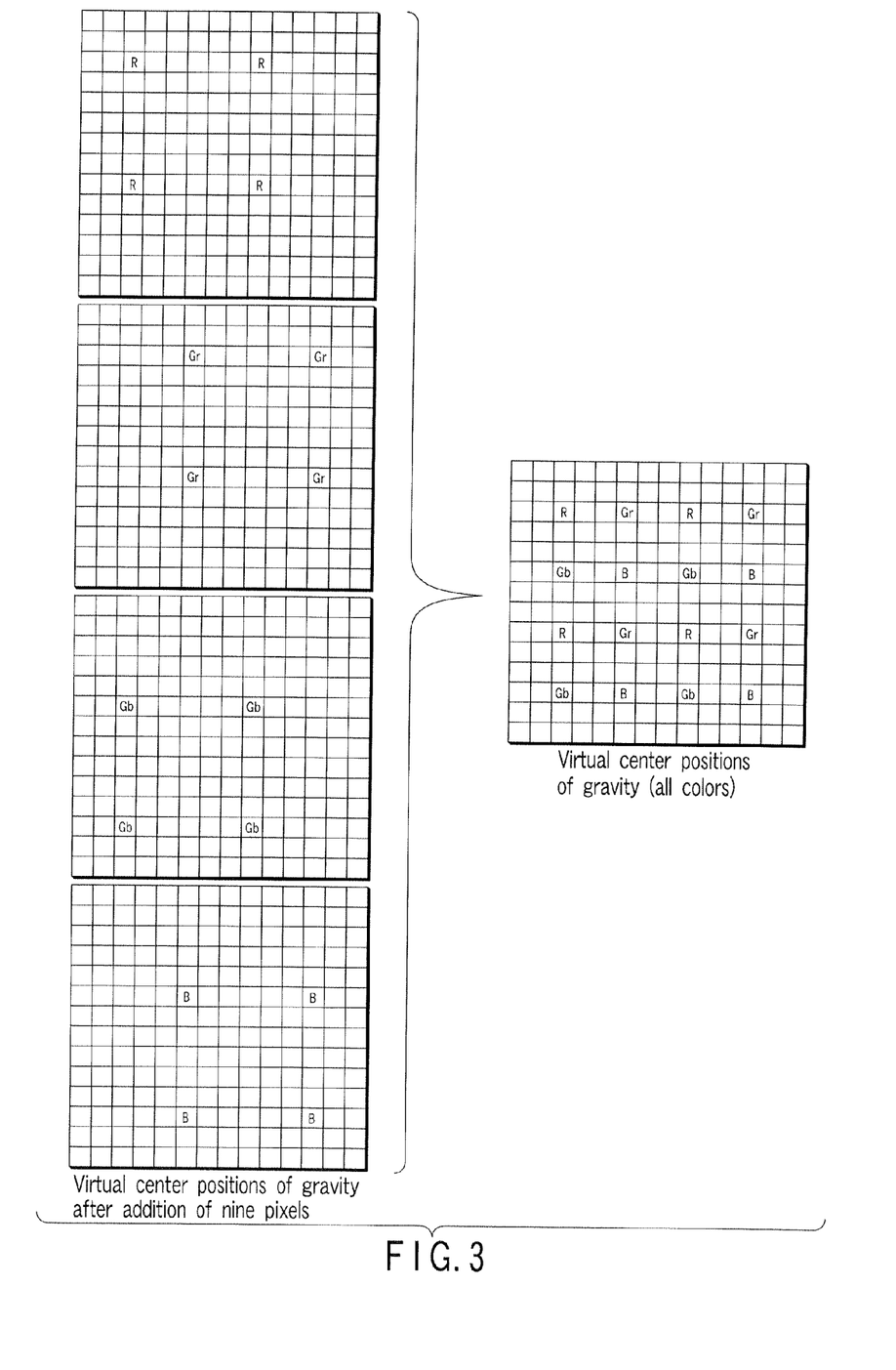
FIG. 3 is a diagram for explaining the virtual center of gravity after addition of nine pixels.

FIG. 2A is a diagram showing a Bayer arrangement of primary colors of the image pickup element 13 shown in FIG. 1. FIG. 2B is a diagram for explaining a 9-pixel addition mode. FIG. 3 is a diagram for explaining the virtual center of gravity after addition of nine pixels.

In a Bayer arrangement of primary colors, a pixel corresponding to the same color filter is arranged at every one pixel. In the 9-pixel addition mode, the image pickup element 13 generates an analog image signal by adding electric charges of nine pixels of the same color arranged at every one pixel in horizontal and vertical directions. The virtual center of gravity of each color component after addition of nine pixels is a center pixel position of 9 pixels×9 pixels shown in FIG. 2B. As shown in FIG. 3, in the 9-pixel addition mode, the virtual center of gravity of each color component is the same as the position of each color component in the Bayer arrangement shown in FIG. 2A. The center of gravity is not displaced in the 9-pixel addition mode. Namely, it is unnecessary to correct displacement of the center of gravity of each color component.

<4-Pixel Addition>

Figure 4A:
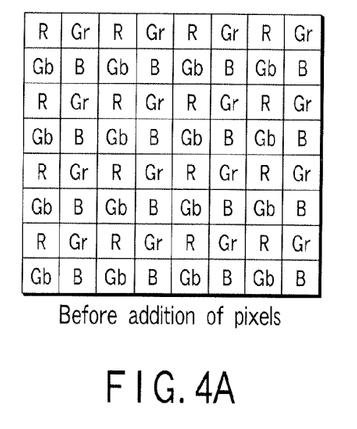
FIG. 4A is a diagram showing a Bayer arrangement of primary colors of the image pickup element 13 shown in FIG. 1.
Figure 4B:
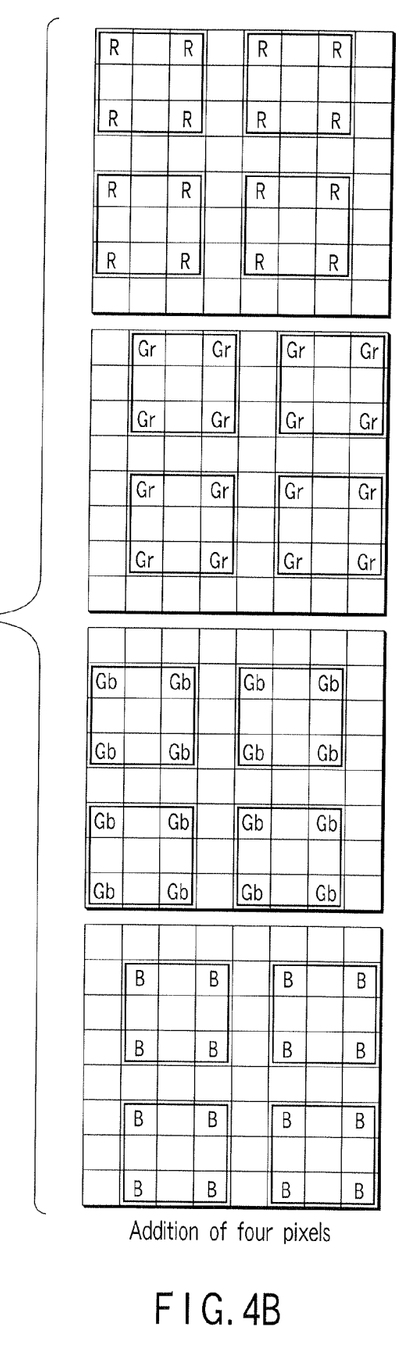
FIG. 4B is a diagram for explaining addition of four pixels in a 4-pixel addition mode.
Figure 5:
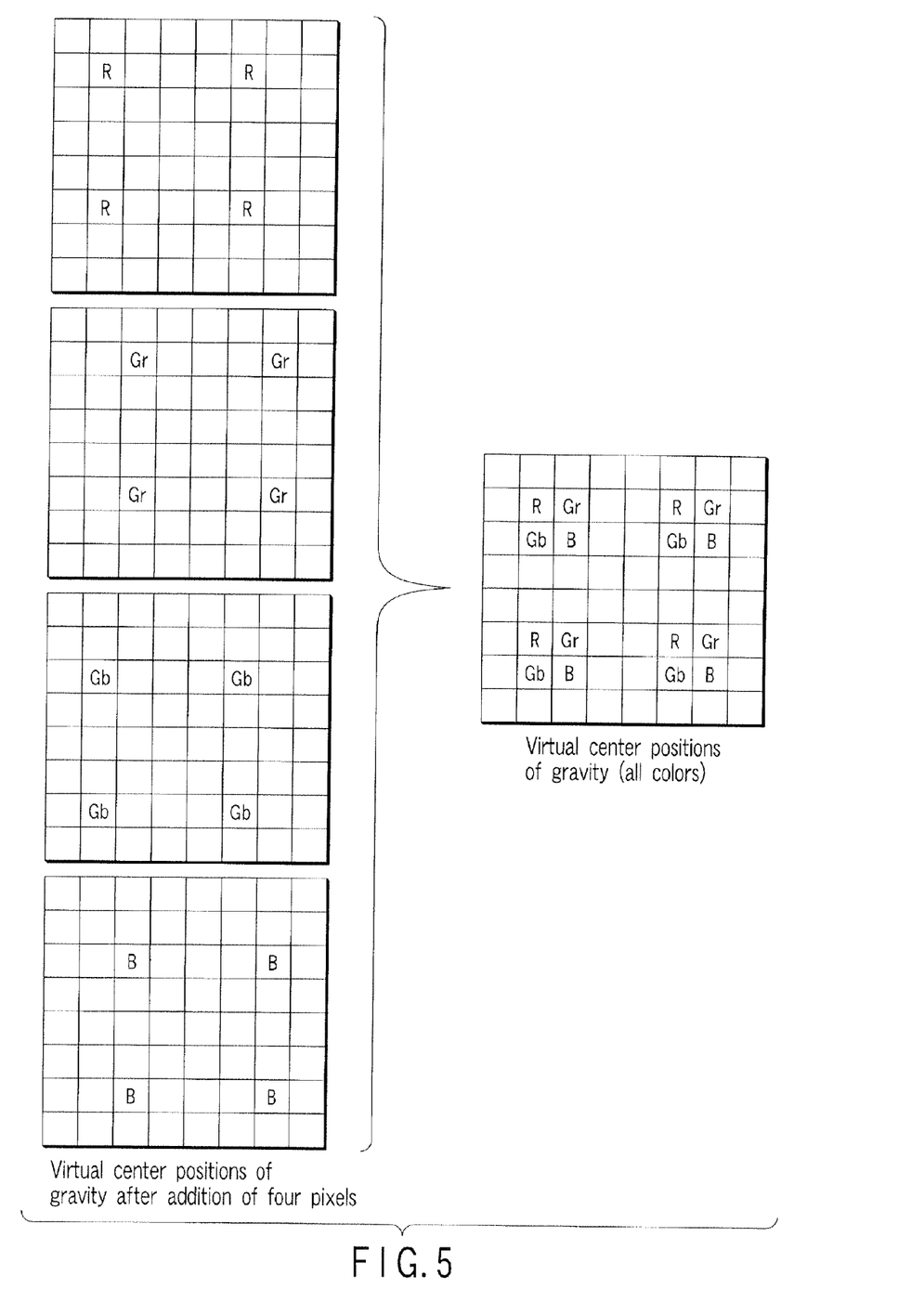
FIG. 5 is a diagram explaining the virtual center of gravity after addition of four pixels.

FIG. 4A is a diagram showing a Bayer arrangement of primary colors of the image pickup element 13 shown in FIG. 1. FIG. 4B is a diagram for explaining a 4-pixel addition mode. FIG. 5 is a diagram explaining the virtual center of gravity after addition of four pixels.

In the 4-pixel addition mode, the image pickup element 13 generates an analog image signal by adding electric charges of the same color four pixels arranged at every one pixel in horizontal and vertical directions. The virtual center of gravity of each color component after addition of four pixels is a center pixel position of 4 pixels×4 pixels shown in FIG. 4B. As shown in FIG. 5, in the 4-pixel addition mode, the virtual center of gravity of each color component is different from the position of each color component in the Bayer arrangement shown in FIG. 2A. The center of gravity is displaced in the 4-pixel addition mode. Namely, it is necessary to correct displacement of the center of gravity of each color component.

[Image Processing Circuit 17]

Figure 6A:
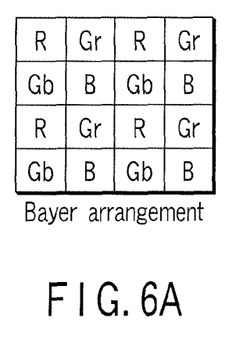
FIGS. 6A and 6B are diagrams for explaining a synchronizing process performed by an image processing circuit shown in FIG. 1.
Figure 6B:
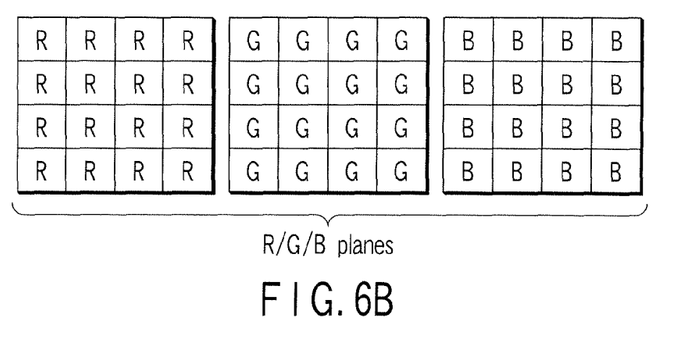
Figure 8A:
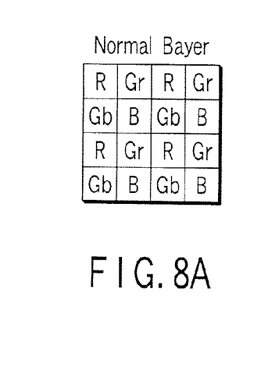
FIGS. 8A, 8B, 8C and 8D are diagrams for explaining image data in a 4-pixel addition mode.

The image processing circuit 17 performs a synchronizing process (interpolation) for image data read from the DRAM 25. The synchronizing process is a process to generate image data having three R/G/B color components for one pixel position from the image data in the Bayer arrangement shown in FIGS. 6A and 8A by interpolation, as shown in FIG. 6B.

Figure 7A:
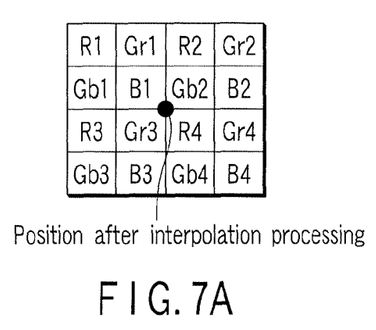
FIGS. 7A, 7B, 7C, 7D, 7E and 7F are diagrams for explaining a synchronizing process in an all-pixel mode executed by the image processing circuit shown in FIG. 1.
Figure 7B:
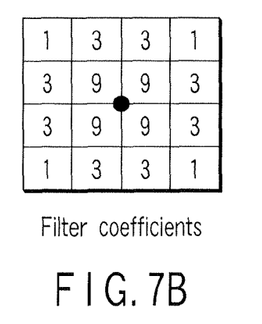
Figure 7C:
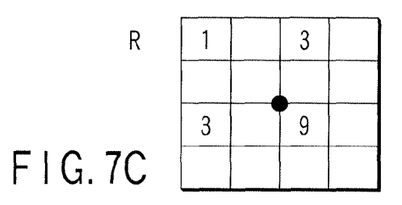
Figure 7D:
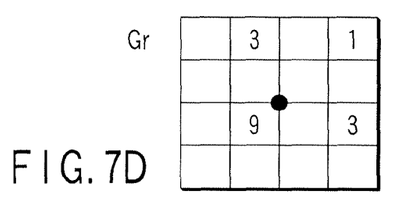
Figure 7E:
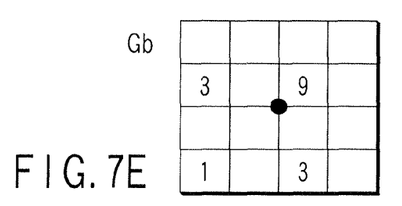
Figure 7F:
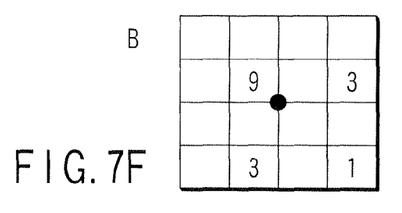

While the image pickup element 13 is operating in the all-pixel mode, color components of the image data read from the DRAM 25 are associated with the positions shown in FIG. 7A. The image processing circuit 17 performs interpolation by using a filter coefficient assigned to each pixel position, as shown in FIG. 7B. Therefore, data of each color component is interpolated at the center position of each block, as shown in FIGS. 7C, 7D, 7E and 7F. For the G-pixel, two kinds of data, Gr and Gb, are interpolated. The image processing circuit 17 writes the interpolated data generated for each color component into the DRAM 25, so that it is assign to all pixel positions, as shown in FIG. 6B.

In FIG. 7B, filter coefficients of color components are 1, 3, 3 and 9. Because, the distance between a pixel position used for interpolation and an interpolation position is 1:3 in both vertical and horizontal. When actually calculating the distance between the pixel position used for interpolation and the interpolation position, a square root must be calculated. This complicates calculations. In this embodiment, the product of the vertical distance and horizontal distance of pixels used for interpolation is used as a filter coefficient, instead of actually calculating the distance.

The image processing circuit 17 performs interpolation expressed by the following equations (1-1) to (1-4). By this interpolation, interpolation data of the center position of block, Rout, Grout, Gbout and Bout, are generated. Namely, as the distance is short, the 2-dimensional average is calculated with more weights. In this embodiment, Rx, Grx, Gbx and Bx (x=an integer) indicate values of the pixels assigned to R, Gr, Gb and B.

$$R\text{out}=(1\times R1+3\times R2+3\times R3+9\times R4)/16 \quad (1\text{-}1)$$

$$Gr\text{out}=(3\times Gr1+1\times Gr2+9\times Gr3+3\times Gr4)/16 \quad (1\text{-}2)$$

$$Gb\text{out}=(3\times Gb1+9\times Gb2+1\times Gb3+3\times Gb4)/16 \quad (1\text{-}3)$$

$$B\text{out}=(9\times B1+3\times B2+3\times B3+1\times B4)/16 \quad (1\text{-}4)$$

For the G-pixel output Gout, the average of Grout and Gbout is used.

Figure 8B:
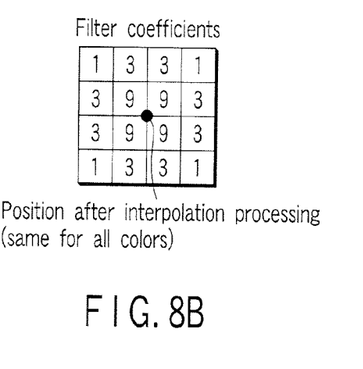
Figure 8C:
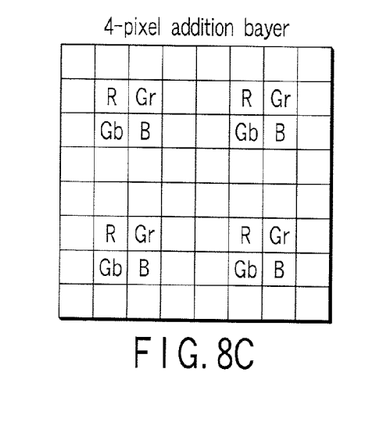
Figure 8D:
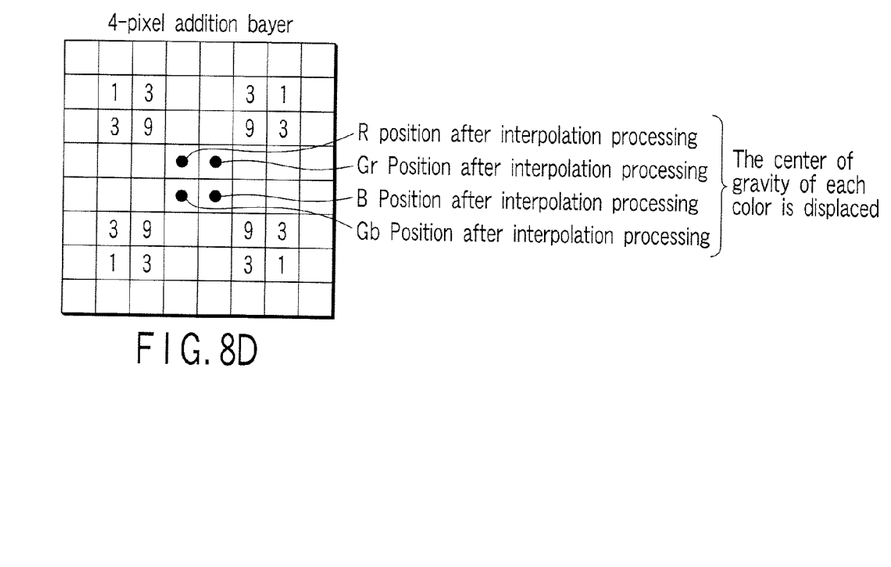

While the image pickup element 13 is operating in the 4-pixel addition mode, the color components of the image data read from the DRAM 25 are associated with the pixel positions shown in FIG. 8C. When the image processing circuit 17 interpolates image data by using a filter coefficient at each pixel position shown in FIG. 8B, the interpolation position of data of each color component becomes as shown in FIG. 8D. Namely, the interpolation position differs for each color component. Thus, the center of gravity of each color component is displaced.

Figure 9A:
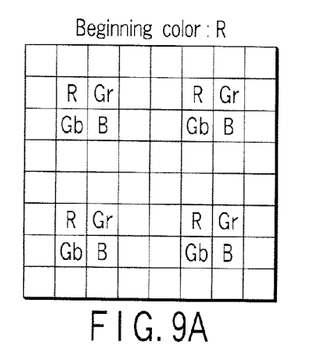
FIGS. 9A, 9B, 9C, 9D, 9E, 9F, 9G and 9H are diagrams for explaining interpolation of image data in a 4-pixel addition mode executed by a conventional technique.
Figure 9B:
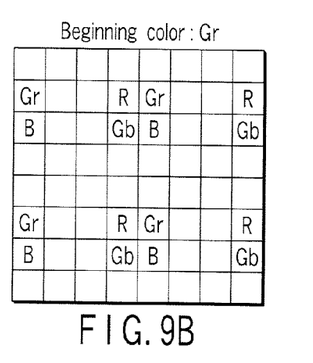
Figure 9C:
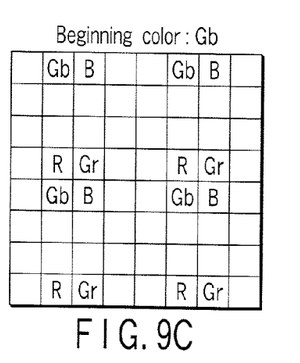
Figure 9D:
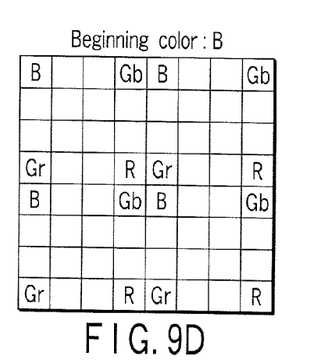
Figure 9E:
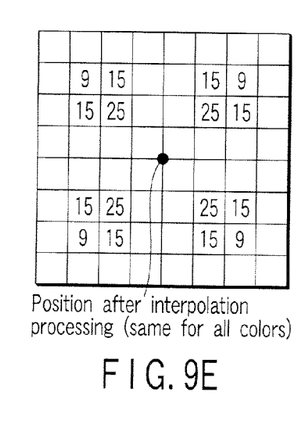
Figure 9F:
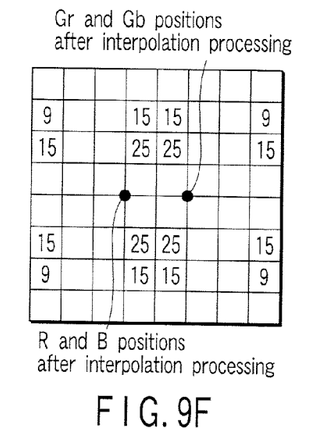
Figure 9G:
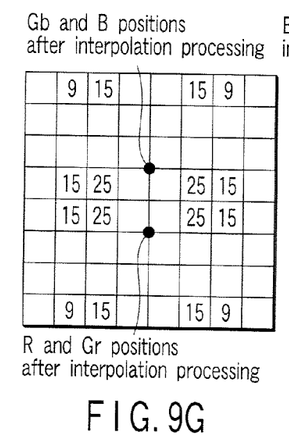
Figure 9H:
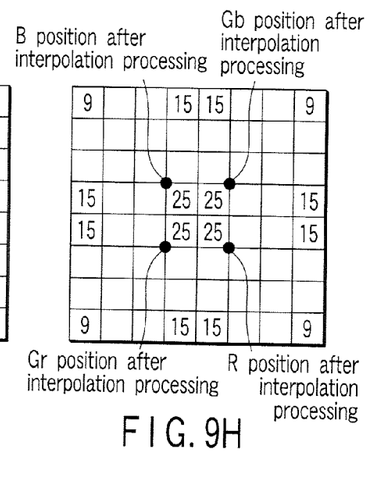

When the filter coefficients shown in FIG. 9E are used for a color layout pattern in the 4-pixel addition mode shown in FIG. 8C, all color component data can be interpolated at the center position of block. However, block data of image data input from the image pickup element 13 is available in four patterns as shown in FIGS. 9A to 9D. Thus, if the same filter coefficients as those in the pattern shown in FIG. 9A are used for interpolation of block corresponding to the patterns of FIGS. 9B to 9D, a data interpolation position of each color component becomes as shown in FIGS. 9F to 9H. In FIGS. 9F to 9H, the data interpolation position of each color component is displaced from the center position of block.

To solve this problem, the image processing circuit 17 performs the following processing. Therefore, even if a block to be synchronized is any one of the color layout patters shown in FIGS. 9A to 9D, data of all color components can be interpolated at the center position of block.

Hereinafter, an explanation will be given on the synchronizing process performed by the image processing circuit 17 in the 4-pixel addition mode.

Figure 10:
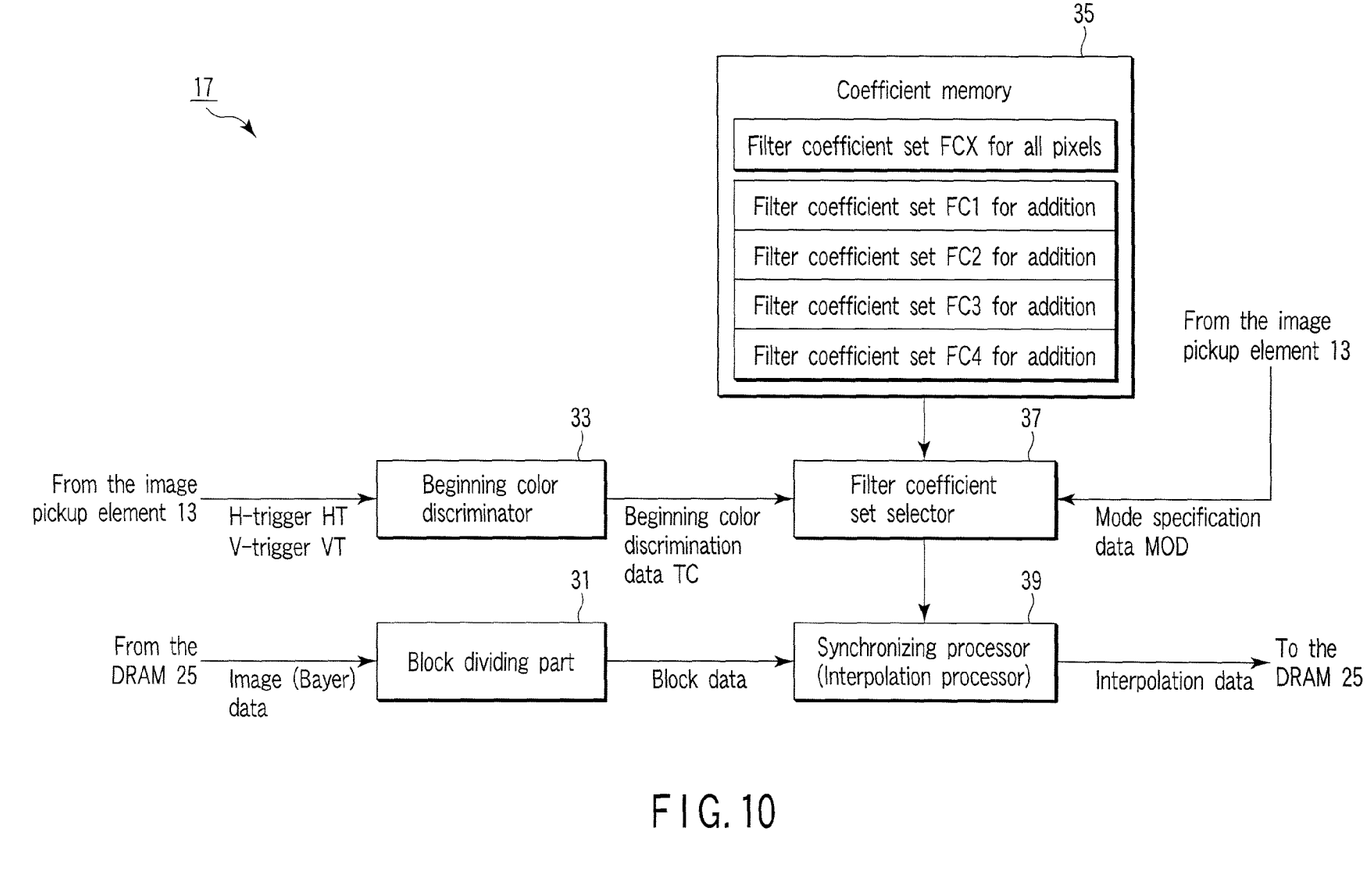
FIG. 10 is a functional block diagram of the image processing circuit shown in FIG. 1.

FIG. 10 is a functional block diagram of the image processing circuit 17 shown in FIG. 1. As shown in FIG. 10, the image processing circuit 17 has a block dividing part 31, a beginning color discriminator 33, a coefficient memory 35, a filter coefficient selector 37, and a synchronizing processor 39, for example. A part or all of the functions of the block dividing part 31, beginning color discriminator 33, filter coefficient selector 37 and synchronizing processor 39 may be realized by an exclusive electronic circuit, or by executing a program in a processing circuit.

The synchronizing processor 39 is an example of an interpolation unit. The filter coefficient selector 37 is an example of a filter coefficient selector. The beginning color discriminator 33 is an example of a color layout discriminator.

The block dividing part 31 reads the image data (Bayer data of primary colors) generated by the image pickup element 13, from the DRAM 25. The block dividing part 31 converts the read image data to block data of N×N blocks, and outputs the block data to the synchronizing processor 39. In this embodiment, N is four.

The beginning color discriminator 33 receives an H-trigger (horizontal synchronizing) signal HT and a V-trigger (vertical synchronizing) signal VT input from the image pickup element 13. The beginning color discriminator 33 discriminates a beginning color component of the block data input to the block dividing part 31, based on these input signals. Then, the beginning color discriminator 33 outputs a beginning color discrimination data TC indicating the discrimination result, to the filter coefficient selector 37.

In this embodiment, a color layout pattern in block data is available in four patterns P1 to P4 as shown in FIGS. 11A, 11B, 11C and 11D. The color layout patterns P1 to P4 are different in the center of gravity of each color component in a block. Beginning colors of block data of color layout patters P1, P2, P3 and P4 are R, Gr, Gb and B, respectively. The beginning color discriminator 33 outputs a beginning color discrimination data TC indicating one of the color components R, Gr, Gb and B, to the filter coefficient selector 37.

The coefficient memory 35 stores a filter coefficient set FCX for all pixels used in the all-pixel mode. The coefficient memory 35 further stores filter coefficient sets FC1, FC2, FC3 and FC4 for addition corresponding to four color layout patterns P1, P2, P3 and P4 used in the 4-pixel addition mode. The filter coefficient sets FC1, FC2, FC3 and FC4 for addition are filter coefficient sets adaptable to the 4-pixel addition mode. As shown in FIGS. 11E, 11F, 11G, 11H and FIGS. 12E, 12F, 12G, 12H, filter coefficients in the filter coefficient sets are different. Because, each filter coefficient is determined depending on the distance between a position of each pixel used for interpolation and an interpolation position for each color component. Therefore, as a color layout pattern differs, filter coefficients forming the filter coefficient set corresponding to the pattern also differs.

The filter coefficient set FCX for all pixels comprises filter coefficients previously defined to interpolate all color components at the center position of block, when block data to be synchronized has a color layout pattern shown in FIG. 7A. The filter coefficients are shown in FIG. 7B.

Figure 11E:
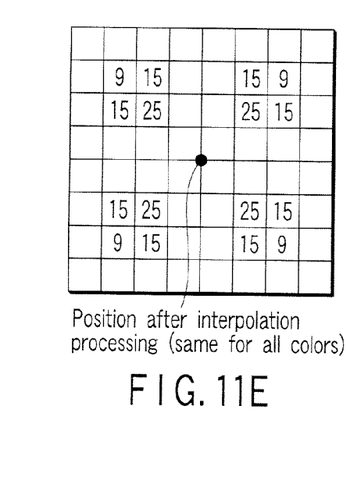
Figure 12A:
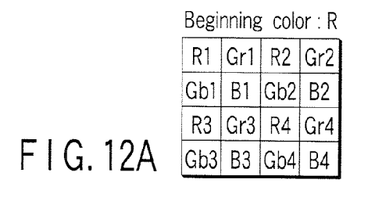
FIGS. 12A, 12B, 12C, 12D, 12E, 12F, 12G and 12H are diagrams for explaining filter coefficients for addition used in the synchronizing process performed by the image processing circuit shown in FIG. 10.

The filter coefficient set FC1 for addition comprises filter coefficients previously defined to interpolate all color components at the center position of block, when block data to be synchronized has a color layout pattern P1. The filter coefficients are shown in FIG. 11E or 12E.

The filter coefficient set FC2 for addition comprises filter coefficients previously defined to interpolate all color components at the center position of block, when block data to be synchronized has a color layout pattern P2. The filter coefficients are shown in FIG. 11F or 12F.

The filter coefficient set FC3 for addition comprises filter coefficients previously defined to interpolate all color components at the center position of block, when block data to be synchronized has a color layout pattern P3. The filter coefficients are shown in FIG. 11G or 12G.

The filter coefficient set FC4 for addition comprises filter coefficients previously defined to interpolate all color components at the center position of block, when block data to be synchronized has a color layout pattern P4. The filter coefficients are shown in FIG. 11H or 12H.

The filter coefficient elector 37 selects one of the filter coefficient sets FCX, and oFC1 to FC4 stored in the coefficient memory 35, and outputs them to the synchronizing processor 39, based on the mode specification data MOD from the image pickup element 13 and the beginning color discrimination data TC from the beginning color discriminator 33. Specifically, when mode specification data MOD specifies the all-pixel mode, the filter coefficient selector 37 selects the filter coefficient set FCX for all pixels, and outputs it to the synchronizing processor 39. When mode specification data MOD specifies the 4-pixel addition mode and the beginning color discrimination data TC indicates R, the filter coefficient selector 37 selects the filter coefficient set FC1 for addition, and outputs it to the synchronizing processor 39. When mode specification data MOD specifies the 4-pixel addition mode and the beginning color discrimination data TC indicates Gr, the filter coefficient selector 37 selects the filter coefficient set FC2 for addition, and outputs it to the synchronizing processor 39. When mode specification data MOD specifies the 4-pixel addition mode and the beginning color discrimination data TC indicates Gb, the filter coefficient selector 37 selects the filter coefficient set FC3 for addition, and outputs it to the synchronizing processor 39. When mode specification data MOD specifies the 4-pixel addition mode and the beginning color discrimination data TC indicates B, the filter coefficient selector 37 selects the filter coefficient set FC4 for addition, and outputs it to the synchronizing processor 39.

In the all-pixel mode, the synchronizing processor 39 performs interpolation indicated by the aforementioned equations (1-1) to (1-4) for the block data input from the block dividing part 31, by using the filter coefficient set FCX for all pixels input from the filter coefficient selector 37. Therefore, the synchronizing processor 39 generates interpolation data, Rout, Grout, Gbout and Bout of the center position of block for each color component.

In the 4-pixel addition mode, the synchronizing processor 39 performs interpolation for the block data input from the block dividing part 31, by using one of the filter coefficient sets FC1 to FC4 for addition input from the filter coefficient selector 37. Then, the synchronizing processor 39 generates interpolation data, Rout, Grout, Gbout and Bout of the center position of block for each color component. Specifically, the synchronizing processor 39 performs interpolation expressed by the following equations (2-1) to (2-4) for block data of the color layout pattern P1 shown in FIG. 11A or 12A, for each color component, by using the filter coefficient set FC1 for addition shown in FIG. 11E or FIG. 12E. Therefore, the synchronizing processor 39 generates interpolation data, Rout, Grout, Gbout and Bout of the center of block.

$$Rout=(9 \times R1+15 \times R2+15 \times R3+25 \times R4)/64 \quad (2\text{-}1)$$

$$Grout=(15 \times Gr1+9 \times Gr2+25 \times Gr3+15 \times Gr4)/64 \quad (2\text{-}2)$$

$$Gbout=(15 \times Gb1+25 \times Gb2+9 \times Gb3+15 \times Gb4)/64 \quad (2\text{-}3)$$

$$Bout=(25 \times B1+15 \times B2+15 \times B3+9 \times B4)/64 \quad (2\text{-}4)$$

Figure 11A:
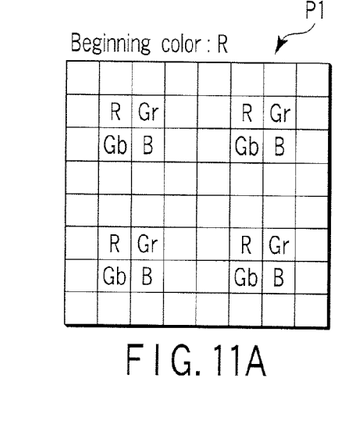
FIGS. 11A, 11B, 11C, 11D, 11E, 11F, 11G and 11H are diagrams for explaining a synchronizing process performed by the image processing circuit shown in FIG. 10.
Figure 11B:
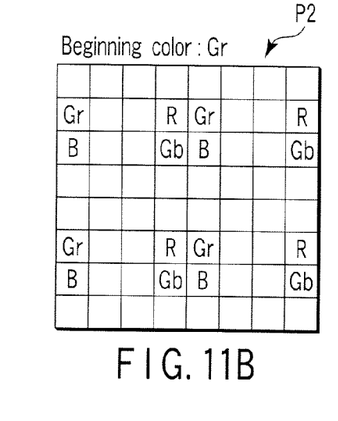
Figure 11C:
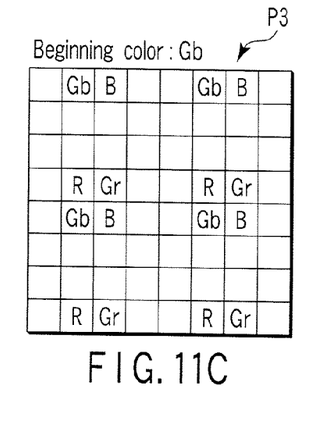
Figure 11D:
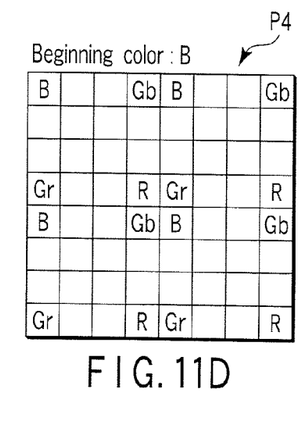
Figure 11F:
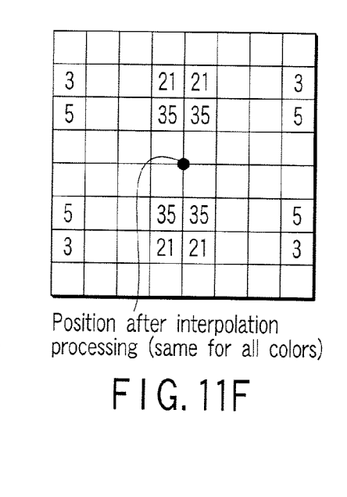
Figure 11G:
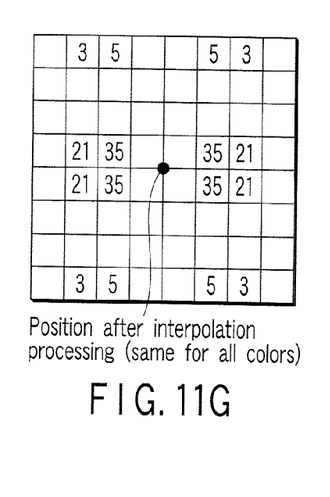
Figure 11H:
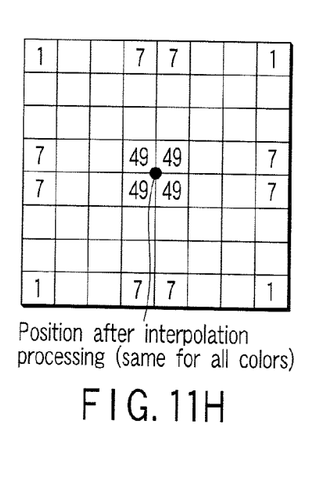
Figure 12B:
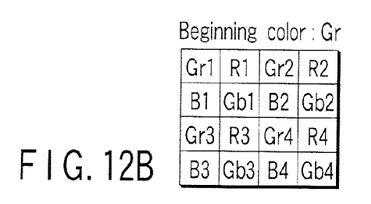
Figure 12C:
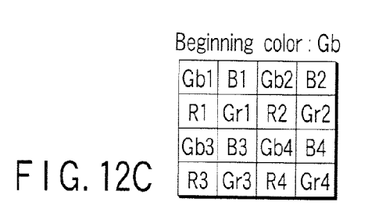
Figure 12D:
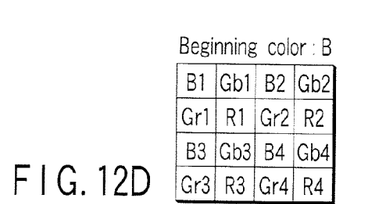
Figure 12E:
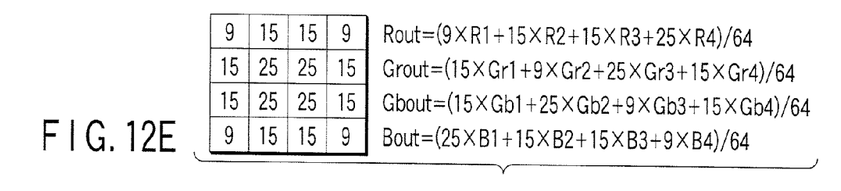
Figure 12F:
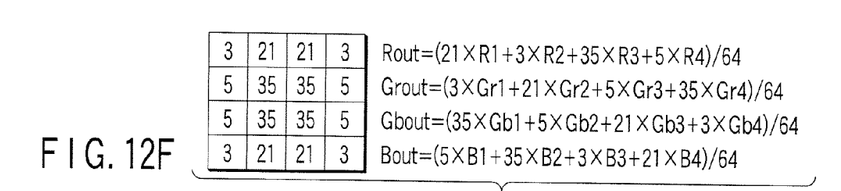
Figure 12G:
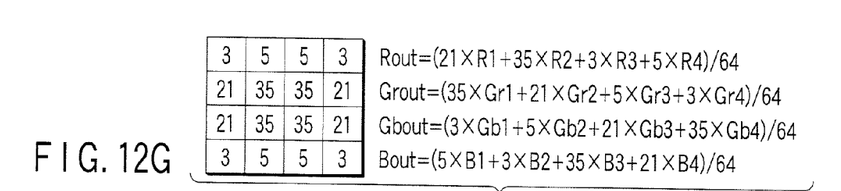
Figure 12H:
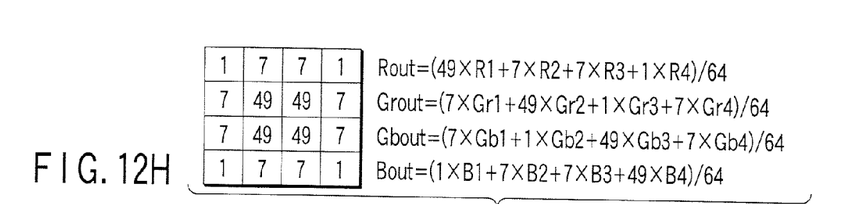

The synchronizing processor 39 performs interpolation expressed by the following equations (3-1) to (3-4) for block data of the color layout pattern P2 shown in FIG. 11B or 12B, for each color component, by using the filter coefficient set FC2 for addition shown in FIG. 11F or FIG. 12F. Therefore, the synchronizing processor 39 generates interpolation data, Rout, Grout, Gbout and Bout of the center position of block.

$$Rout=(21 \times R1+3 \times R2+35 \times R3+5 \times R4)/64 \quad (3\text{-}1)$$

$$Grout=(3 \times Gr1+21 \times Gr2+5 \times Gr3+35 \times Gr4)/64 \quad (3\text{-}2)$$

$$Gbout=(35 \times Gb1+5 \times Gb2+21 \times Gb3+3 \times Gb4)/64 \quad (3\text{-}3)$$

$$Bout=(5 \times B1+35 \times B2+3 \times B3+21 \times B4)/64 \quad (3\text{-}4)$$

The synchronizing processor 39 performs interpolation expressed by the following equations (4-1) to (4-4) for block data of the color layout pattern P3 shown in FIG. 11C or 12C, for each color component, by using the filter coefficient set FC3 for addition shown in FIG. 11G or FIG. 12G. Therefore, the synchronizing processor 39 generates interpolation data, Rout, Grout, Gbout and Bout of the center position of block.

$$Rout=(21 \times R1+35 \times R2+3 \times R3+5 \times R4)/64 \quad (4\text{-}1)$$

$$Grout=(35 \times Gr1+21 \times Gr2+5 \times Gr3+3 \times Gr4)/64 \quad (4\text{-}2)$$

$$Gbout=(3 \times Gb1+5 \times Gb2+21 \times Gb3+35 \times Gb4)/64 \quad (4\text{-}3)$$

$$Bout=(5 \times B1+3 \times B2+35 \times B3+21 \times B4)/64 \quad (4\text{-}4)$$

The synchronizing processor 39 performs interpolation of the following equations (5-1) to (5-4) for block data of the color layout pattern P4 shown in FIG. 11D or 12D, for each color component, by using the filter coefficient set FC4 for addition shown in FIG. 11H or FIG. 12H. Therefore, the synchronizing processor 39 generates interpolation data, Rout, Grout, Gbout and Bout of the center position of block.

$$Rout=(49 \times R1+7 \times R2+7 \times R3+1 \times R4)/64 \quad (5\text{-}1)$$

$$Grout=(7 \times Gr1+49 \times Gr2+1 \times Gr3+7 \times Gr4)/64 \quad (5\text{-}2)$$

$$Gbout=(7 \times Gb1+1 \times Gb2+49 \times Gb3+7 \times Gb4)/64 \quad (5\text{-}3)$$

$$Bout=(1 \times B1+7 \times B2+7 \times B3+49 \times B4)/64 \quad (5\text{-}4)$$

The synchronizing processor 39 generates the average of Grout and Gbout as a G-output Gout. The synchronizing processor 39 writes the interpolation data, Rout, Gout and Bout generated for each block data into the DRAM 25. Therefore, pixel values of all pixel positions for all of R, G and B components are written into the DRAM 25.

Figure 13:
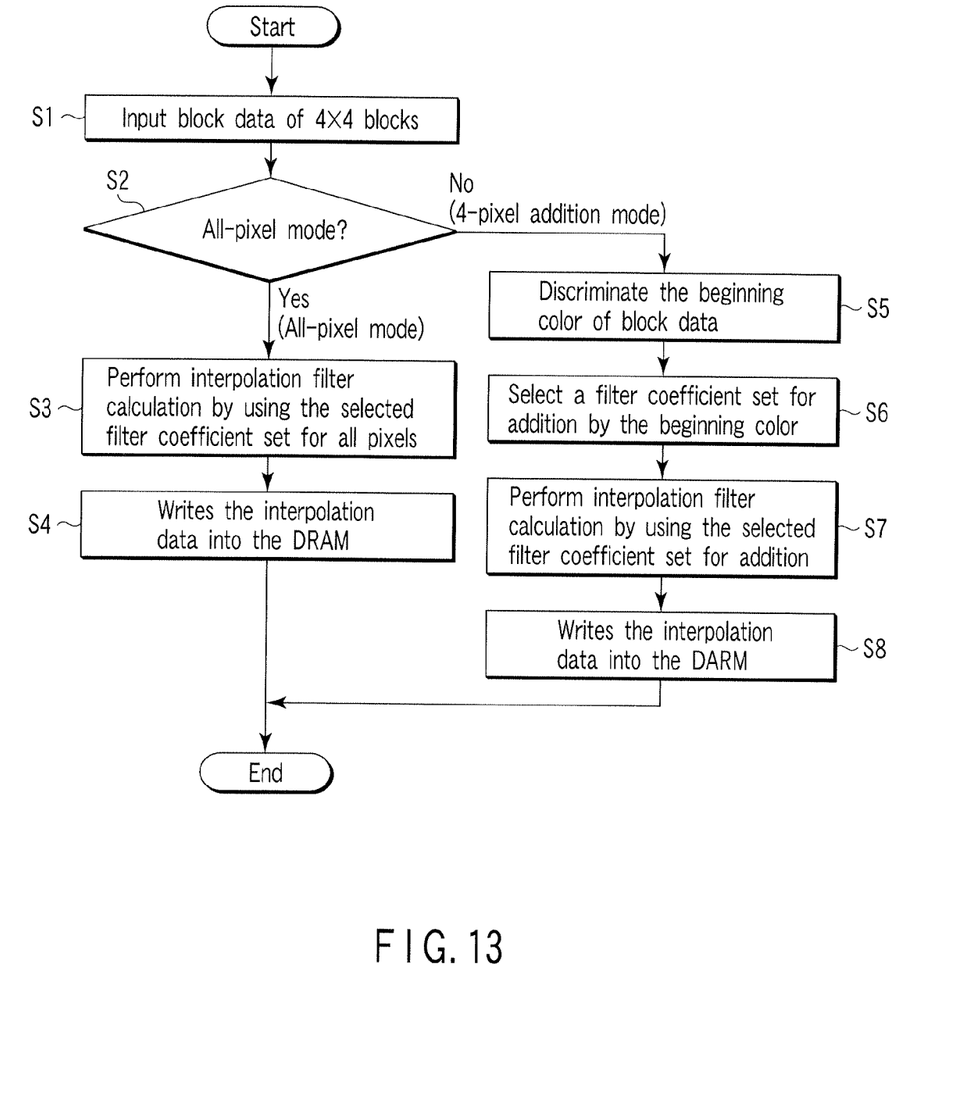
FIG. 13 is a flowchart for explaining the synchronizing process performed by the image processing circuit shown in FIG. 10.

Hereinafter, an explanation will be given on an operation example of the synchronizing process performed by the image processing circuit 17 shown in FIG. 1. FIG. 13 is a flowchart for explaining an operation example of the synchronizing process performed by the image processing circuit 17 shown in FIG. 1.

Step S1:
The block dividing part 31 converts the image data (Bayer data of primary colors) read from the DRAM 25 to block data of 4×4 blocks, and outputs the block data to the synchronizing processor 39.

Step S2:
The image processing circuit 17 judges whether the mode specification data MOD input from the image pickup element specifies the all-pixel mode. When the mode specification data MOD specifies the all-pixel mode, the processing goes to step S3. When the mode specification data MOD specifies the 4-pixel addition mode, the processing goes to step S5.

Step S3:
The synchronizing processor 39 performs interpolation for block data input from the block dividing part 31, by using the filter coefficient set FCX for all pixels input from the filter coefficient selector 37. Therefore, the synchronizing processor 39 generates the interpolation data, Rout, Grout, Gbout and Bout of the center position of block, for each color component. The synchronizing processor 39 generates the average of Grout and Gbout, as a G-output Gout.

Step S4:
The synchronizing processor 39 writes the interpolation data Rout, Gout and Bout generated in the step S3 into the DRAM 25 as pixel data of all pixel positions of 4×4 block. Therefore, pixel values of all pixel position are written into the DRAM 25, for all of R, G and B components.

Step S5:
The beginning color discriminator 33 counts an H-trigger (horizontal synchronizing) signal HT and a V-trigger (vertical synchronizing) signal VT input from the image pickup element 13, and discriminates the beginning color component of each block data converted to blocks by the block dividing part 31, according to the counting result. The beginning color discriminator 33 outputs the beginning color discrimination data TC indicating the discrimination result, to the filter coefficient selector 37.

Step S6:
The filter coefficient selector 37 selects one of the filter coefficient sets FC1 to FC4 for addition stored in the coefficient memory 35, and outputs it to the synchronizing processor 39, based on the mode specification data MOD from the image pickup element 13 and the beginning color discrimination data TC from the beginning color discriminator 33.

Step S7:

The synchronizing processor 39 performs interpolation for the block data input from the block dividing part 31, by using the filter coefficient set for addition selected by the filter coefficient selector 37. Therefore, the synchronizing processor 39 generates the interpolation data, Rout, Grout and Bout of the center position of block, for each color component.

Step S8:

The synchronizing processor 39 writes the interpolation data, Rout, Gout and Bout generated in the step S7 into the DRAM 25 as pixel data of all pixel positions of 4×4 blocks.

The synchronizing processor 39 performs the above-mentioned processing of steps S1 to S8 for all block data.

Hereinafter, an explanation will be given on the operation of the electronic camera 1 shown in FIG. 1.

[Photographing]

Light corresponding to an optical image of a subject formed by the optical system 11 is received by each pixel of the image pickup element 13.

The image pickup element 13 is operated in the aforementioned all-pixel mode or 4-pixel addition mode. The image pickup element 13 generates an analog image signal by photoelectrically converting electric charge stored in each pixel. Then, the image pickup element 13 outputs the image signal to the ADC 15. The ADC 15 converts the analog image signal generated by the image pickup element 13 to a digital signal (image data), and writes it into the DRAM 25.

The image processing circuit 17 performs the synchronizing process already explained in FIG. 13 for the image data read from the DRAM 25. Then, the image processing circuit 17 writes the result of the processing into the DRAM 25. In the synchronizing process, pixel values of all pixel positions are generated by interpolation for each color component of the image data read from the DRAM 25.

The JPEG encoder/decoder 19 reads the image data processed by the image processing circuit 17 from the DRAM 25, encodes the image data, and writes the encoded image data into the memory card 23, for example.

[Reproducing]

Encoded image data to be reproduced is read from the memory card into the DRAM 25.

The JPEG encoder/decoder 19 decodes the encoded image data read from the DRAM 25, and outputs the decoded image data to the video encoder 21. The video encoder 21 performs a reproducing process for the image data input from the JPEG encoder/decoder 19, and generates a reproducing image signal. The video encoder 21 displays an image in the monitor 29, based on the reproducing image signal.

As explained hereinbefore, in this embodiment, when image data is generated in the 4-pixel addition mode, specific filter coefficient sets for addition FC1 to FC4 is selected and used for a synchronizing process, based on a color layout pattern of block data to be synchronized. Therefore, even if the virtual center of gravity is displaced in each color component of the image data supplied from the image pickup element 13, a synchronizing process with consideration given to displacement of the virtual center of gravity is possible. Therefore, interpolation data of each color component can be interpolated at the center position of block, without providing a specific correction circuit.

The invention is not to be limited to the aforementioned embodiment. Those skilled in the art may add modifications, combinations or sub-combinations, or may make substitution of the components of the embodiment without departing from the technical scope or the equivalent of the invention. For example, in the embodiment described herein, image data generated in the 4-pixel addition mode in the image pickup element 13 is processed by the synchronizing processor 39. In addition, in the image pickup element 13, image data may be generated in an optional addition mode in which the center of gravity of each color component is displaced. Even in this case, the synchronizing processor 39 interpolates all color components at the same interpolation positions in a block, by interpolating related image data by selectively using sets of filter coefficients.

Further, in the embodiment described herein, interpolation is performed at the center position of a block, but interpolation may be performed at a position other than the center of a block, as long as the interpolation position is the same in any color component.

Further, in the embodiment described herein, the image pickup element 13 adds electric charge of the same pixel in both horizontal and vertical directions, in the pixel addition mode. Electric charge of the same color pixel may be added only in one of the horizontal and vertical directions.

Further, in the embodiment described herein, a pixel layout is 4×4 in the image pickup element 13. A pixel layout is optional, as long as N×M (N and M are integers not less than 3).

Further, pixels forming the image pickup element 13 are not to be limited to be arranged like a square grid, but may be arranged like a honeycomb.

Further, in the embodiment described herein, a color component is fixedly assigned to each pixel. But, it may be permitted to use a technique to randomly determine a pattern of assigning a color component to each pixel upon photographing. In this case, an analog signal is generated by adding electric charges of the same color pixels, based on a randomly determined pattern of assigning a color component, and interpolation is performed by the image processing circuit 17 by dynamically generating a filter coefficient corresponding to that assignment pattern.

What is claimed is:

1. An image processing apparatus for obtaining color image data by performing an interpolation processing for an image signal output from a color image pickup element having color filters arranged like a mosaic, by using a filter, comprising:

an interpolation processing unit which selectively modifies an interpolation processing according to a kind of layout pattern of a spatial center position of gravity of each color component signal included the image signal in an image area to be interpolated, so that the spatial center position of gravity of each color component signal after the interpolation processing becomes identical in any layout pattern, if there are a plurality of kinds of layout pattern of a spatial center position of gravity of each color component signal included the image signal in an image area to be interpolated.

2. The image processing apparatus according to claim 1, wherein the interpolation processing unit selects interpolation filter coefficients according to the kind of the layout pattern in an image area to be interpolated, and performs the interpolation processing for the image data in an image area to be interpolated by using the selected interpolation filter coefficients.

3. The image processing apparatus according to claim 2, further comprising:

a filter coefficient selector which selects a set of interpolation filter coefficients from a plurality of sets of interpolation filter coefficients, based on the kind of the layout pattern in an image area to be interpolated, wherein the interpolation processing unit performs, the interpolation processing for the image data in an image area to be interpolated by using the set of interpolation filter coefficients selected by the filter coefficient selector.

4. The image processing apparatus according to claim 2, wherein the interpolation filter coefficients are determined based on a function of a distance between a position of each pixel used for the interpolation processing for each color component and a position after interpolation processing.

5. The image processing apparatus according to claim 3, further comprising a color layout pattern discriminator which discriminates the kind of the layout pattern based on a layout of color component signals included the image signal in an image area to be interpolated,
    wherein the filter coefficient selector selects the set of interpolation filter coefficients from the plurality of sets of interpolation filer coefficients, based on a kind of the layout pattern discriminated by the color layout discriminator.

6. The image processing apparatus according to claim 3, wherein the image area to be interpolated consists of 4×4 pixels, and the plurality of sets of interpolation filter coefficients include interpolation filter coefficients based on the ratios of 9:15:15:25, 3:21:5:35 and 1:7:7:49.

7. The image processing apparatus according to claim 5, wherein the color layout discriminator discriminates the layout of color component signals, based on a color corresponding to a beginning pixel in an image area to be interpolated.

8. The image processing apparatus according to claim 1, wherein the image signal is a signal obtained from an, image pickup element having a Bayer arrangement and obtained by adding and outputting results of receiving from pixels corresponding to same color component signals in a pixel addition mode.

9. The image processing apparatus according to claim 1, wherein the image area to be interpolated comprises pixel values generated based on results of receiving from N×N pixels.

10. An electronic camera comprising:
    a color image pickup element having color filters arranged like a mosaic; and
    an interpolation processing unit which obtains a color image data by performing an interpolation processing for an image signal output from the color image pickup element, by using a filter,
    wherein the interpolation processing unit selectively modifies an interpolation processing according to a kind of a layout pattern of a spatial center position of gravity of each color component signal included the image signal in an image area to be interpolated, so that the spatial center position of gravity of each color component signal after the interpolation processing becomes identical in any layout pattern, if there are a plurality of kinds of layout pattern of a spatial center position of gravity of each color component signal included the image signal in an image area to be interpolated.

11. An image processing method for obtaining color image data by performing interpolation processing for an image signal output from a color image pickup element having color filters arranged like a mosaic, by using a filter, comprising:
    determining whether there are a plurality of kinds of layout pattern of position of spatial center of gravity of each color component signal included the image signal in an image area to be interpolated; and
    changing an interpolation processing according to a kind of a layout pattern of a spatial center position of gravity of each color component signal included the image signal in an image area to be interpolated, so that the spatial center position of gravity of each color component signal after the interpolation processing becomes identical in any layout pattern, if there are a plurality of kinds of layout pattern of a spatial center position of gravity of each color component signal included the image signal in an image area to be interpolated.

* * * * *